United States Patent
Takano et al.

(10) Patent No.: US 8,883,905 B2
(45) Date of Patent: Nov. 11, 2014

(54) METHOD OF MANUFACTURING POWDER COATING COMPOSITION

(75) Inventors: Yasushi Takano, Kashihara (JP); Taro Morimitsu, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 109 days.

(21) Appl. No.: 13/202,334

(22) PCT Filed: Jan. 22, 2010

(86) PCT No.: PCT/JP2010/050772
§ 371 (c)(1), (2), (4) Date: Aug. 19, 2011

(87) PCT Pub. No.: WO2010/095485
PCT Pub. Date: Aug. 26, 2010

(65) Prior Publication Data
US 2012/0016078 A1    Jan. 19, 2012

(30) Foreign Application Priority Data
Feb. 20, 2009    (JP) .................................. 2009-037792

(51) Int. Cl.
| | | |
|---|---|---|
| C08K 3/08 | (2006.01) | |
| C09D 5/03 | (2006.01) | |
| C09D 7/12 | (2006.01) | |
| C09C 3/10 | (2006.01) | |
| B82Y 30/00 | (2011.01) | |
| C09D 7/14 | (2006.01) | |

(52) U.S. Cl.
CPC ............ C09D 5/032 (2013.01); *C01P 2006/12* (2013.01); C09D 7/1266 (2013.01); C09D 7/1291 (2013.01); *C01P 2004/20* (2013.01); *C08K 3/08* (2013.01); *C01P 2004/61* (2013.01); *C01P 2004/64* (2013.01); C09C 3/10 (2013.01); B82Y 30/00 (2013.01); C09D 7/14 (2013.01); *C01P 2006/60* (2013.01)
USPC ............................. 524/441; 106/404; 523/404

(58) Field of Classification Search
USPC ............................. 524/441; 523/204; 106/404

IPC .......................................................... C09D 5/03
See application file for complete search history.

(56) References Cited

U.S. PATENT DOCUMENTS

| | | | |
|---|---|---|---|
| 4,003,872 A | 1/1977 | Rolles et al. | |
| 6,541,540 B2 * | 4/2003 | Hashizume | ................... 523/205 |
| 2001/0031817 A1 | 10/2001 | Hashizume | |
| 2003/0008963 A1 | 1/2003 | Hashizume | |
| 2004/0151940 A1 * | 8/2004 | Takano et al. | ................. 428/650 |
| 2006/0014858 A1 | 1/2006 | Takano | |
| 2008/0022899 A1 | 1/2008 | Tsuji et al. | |

FOREIGN PATENT DOCUMENTS

| | | |
|---|---|---|
| CN | 1714128 A | 12/2005 |
| CN | 101117461 A | 2/2008 |
| DE | 2457799 A1 | 6/1975 |
| EP | 1134264 A1 | 9/2001 |
| EP | 1266946 A1 | 12/2002 |
| EP | 1445290 A1 | 8/2004 |
| EP | 1566419 A1 | 8/2005 |
| JP | 50-34642 | 4/1975 |
| JP | 51-137725 A | 11/1976 |
| JP | 9-71734 A | 3/1997 |
| JP | 2001-181576 A | 7/2001 |
| JP | 2001-329226 A | 11/2001 |
| JP | 2004-175813 A | 6/2004 |
| WO | WO 02/094950 A1 | 11/2002 |

* cited by examiner

*Primary Examiner* — Brieann R Fink
(74) *Attorney, Agent, or Firm* — Birch, Stewart, Kolasch & Birch, LLP

(57) ABSTRACT

The present invention is directed to a method of manufacturing a powder coating composition containing thermosetting resin powders to which surface flake pigments have been bonded, and the method includes a first step of preparing the flake pigments having an average particle size not greater than 10 μm or an average thickness not greater than 60 nm, a second step of obtaining a dispersion by dispersing the flake pigments above in a solvent not dissolving the thermosetting resin powders, a third step of obtaining a mixture by mixing the thermosetting resin powders with the dispersion above, and a fourth step of volatilizing and removing the solvent above while the mixture above is stirred.

10 Claims, No Drawings

METHOD OF MANUFACTURING POWDER COATING COMPOSITION

TECHNICAL FIELD

The present invention relates to a method of manufacturing a powder coating composition containing thermosetting resin powders to which surface flake pigments have been bonded.

BACKGROUND ART

As a low-pollution coating without using an organic solvent, there has been a growing demand for a powder coating in automobile parts, electric appliances, furniture, machine tool, business equipment, toys, and the like. Coating with the powder coating thus causes low pollution, and in addition, sufficient thickness of the coating film can be achieved by one time application, and it is not necessary to apply coating as many times as in an example using a conventional solvent-type coating. That is, a time period for coating can be shortened. Moreover, as the solvent is not contained in the coating, the powder coating is advantageous also in that a pinhole will not be created in the coating film. Color variation demanded of a powder coating is also required as in the conventional coating and demands for a metallic color are also high. Among others, a metallic color similar to plating has increasingly been demanded mainly from interior products in recent years.

With the powder coating with characteristics as described above, characteristics of a coating film without containing flake pigments are excellent and no problem arises. On the other hand, if flake pigments are contained, problems as follows will arise.

For metallic coating with a powder coating, conventionally, a melt blending method in which flake pigments are sufficiently mixed and kneaded with a resin or coloring pigments in advance using a melting method, and thereafter a resultant substance is pulverized by crushing or the like; a dry blending method in which resin powders and flake pigments are mixed and applied, a bonded method using resin powders having a surface adhering to a flake pigment, and the like have been known (Japanese Patent Laying-Open No. 51-137725 (Patent Literature 1), Japanese Patent Laying-Open No. 09-071734 (Patent Literature 2), Japanese Patent Laying-Open No. 50-034642 (Patent Literature 3), WO2002/094950 (Patent Literature 4), and the like).

In the melt blending method, the flake pigments tend to deform during the step of mixing and kneading or the subsequent step of controlling a resin powder particle size by crushing, and excellent metallic feel cannot be obtained after coating. In addition, when aluminum flakes are used as the flake pigments, an active surface of aluminum is exposed in the crushing step and possibility of ignition, dust explosion or the like will be higher.

In the dry blending method, deformation of flake pigments is relatively unlikely. On the other hand, as the pigments need to bear electrical charges during coating, a surface thereof should be coated with a resin or the like in advance, if metal pigments such as aluminum flakes are used. Unless coating with a resin coat or the like is provided, an applied voltage may leak to cause voltage lowering or a spark may be produced in the vicinity of an electrode particularly in corona-type electrostatic coating. In particular, the latter may become a source of ignition of dust explosion, and hence coating with substantially uncoated metal pigments (flake pigments) with the use of the dry blending method may be considered as impossible. In addition, even in a case of such a flake pigment that a surface of a metal pigment is coated with a resin, as the flake pigment and the resin powder have different charged rates respectively, a separation phenomenon between the resin powder and the flake pigment takes place during coating, resulting in lower performance in terms of design of the coating film. Further, a ratio of content of the pigments varies before and after application of the powder coating. Therefore, if the coating is recovered for reuse, a color tone is altered, which means that recycle of the coating is virtually impossible. Furthermore, the resin powders and the flake pigments are present in an unbalanced manner during coating, which leads to likeliness of unevenness of color.

In contrast to the two methods above, a bonded method is the best method as a form of a powder coating containing flake pigments, because the previously described problems will all be solved if a bonded structure in which resin powders and flake pigments are bonded to each other in an ideal form could be realized. How to form the bonded structure, however, is in turn an issue. A method of attaching a flake pigment to a surface of a resin powder by using a brush polisher, a method of transferring and bonding a flake pigment to a surface of a resin powder by bringing the resin powder in contact with a dispersion medium such as an alumina ball coated with the flake pigment, a method of heat-sealing a resin powder and a flake pigment to each other by dispersing resin powders and flake pigments in a three-dimensional rotary mixer or the like while a temperature around the melting point of the resin powder is set, a method of attaching a flake pigment to a surface of a resin powder with the use of a binder, and the like are known as the methods of forming a bonded structure. In particular, the method using a binder has such a feature that a high ratio of bonding between a flake pigment and a resin powder is achieved and further generation of an aggregated mass of flake pigments and resin powders is less likely in a manufacturing process, and thus it is considered as a particularly good forming method (Patent Literature 4).

CITATION LIST

Patent Literature

PTL 1: Japanese Patent Laying-Open No. 51-137725
PTL 2: Japanese Patent Laying-Open No. 09-071734
PTL 3: Japanese Patent Laying-Open No. 50-034642
PTL 4: WO2002/094950

SUMMARY OF INVENTION

Technical Problem

For color development of a metallic color similar to plating with the use of flake pigments, a flake pigment in a fine particulate form having an average particle size not greater than 10 μm or a very thin flake pigment having an average thickness not greater than 60 nm should be employed as the flake pigment. In an attempt to provide a metallic color coating similar to plating with a dry blending method, however, if a metal pigment is used for a flake pigment, a surface of the flake pigment should be coated with a resin due to the problems in the dry blending method above.

With the surface of the flake pigment being coated with the resin, however, in many cases, a tendency is such that a sharp color tone similar to plating cannot be obtained. In particular, in a case where coating with a resin not less than 5 g per 100 g flake pigments is carried out, this tendency is noticeable. Even if a reflectance is high, a sharp color tone similar to plating cannot be obtained due to diffuse reflection by the provided resin coating. It is noted that sharpness herein refers to a visually recognized effect to such an extent that a reflected image (mirror image) observed as a result of reflection by a coating film can clearly visually be recognized.

Therefore, in consideration also of the problems in the dry blending method above, it is substantially impossible to coat with the dry blending method, a flake pigment in a specific shape as above suited for color development of a metallic color similar to plating. Namely, a metallic color similar to plating cannot be expressed with the dry blending method.

On the other hand, if a powder coating composition having a metallic color similar to plating by using the bonded method is sought, the flake pigment should once be in a powdery form in a dry state. During the course of achieving such a state, flake pigments aggregate, which leads to failure in obtaining a desired bonded structure. In addition, in a case where this aggregate is crushed again, risk in handling metal fine powders is involved and in addition, lowering in color tone also occurs due to deformation of a flaky shape. Even though the flake pigments could be dried without aggregating by exercising ingenuity, dry powders of the flake pigments tend to behave as dust, they are poor in operability, and they entail the risk of dust explosion. Therefore, a powder coating composition having a desired metallic color similar to plating cannot be manufactured even with the bonded method.

Thus, a method suitably allowing manufacturing of a powder coating composition containing flake pigments having a shape suited for color development of a metallic color similar to plating is still unknown.

The present invention was made in view of such circumstances, and an object thereof is to provide a method suitably allowing manufacturing of a powder coating composition containing flake pigments having a specific shape as suited for color development of a metallic color similar to plating.

Solution to Problem

The present inventors conducted dedicated studies for solving the problems as described above, and noted that flake pigments having a shape suited for color development of a metallic color similar to plating are highly likely to aggregate during drying. Then, to the contrary, the present inventors conceived that flake pigments might be bonded to a surface of a resin powder by making use of this characteristic. Then, as a result of further dedicated studies based on this conception, the present inventors found that a suitable powder coating composition can be manufactured by dispersing flake pigments in a volatile solvent not dissolving resin powders, mixing the dispersion with the resin powders, and volatilizing and removing the solvent while performing stirring, and finally completed the present invention.

Namely, the present invention is directed to a method of manufacturing a powder coating composition containing thermosetting resin powders to which surface flake pigments have been bonded, and the method includes a first step of preparing flake pigments having an average particle size not greater than 10 µm or an average thickness not greater than 60 nm, a second step of obtaining a dispersion by dispersing the flake pigments above in a solvent not dissolving the thermosetting resin powders, a third step of obtaining a mixture by mixing the thermosetting resin powders with the dispersion above, and a fourth step of volatilizing and removing the solvent above while the mixture above is stirred.

Here, in the fourth step above, the mixture above is preferably stirred in a range from −5° C. to 50° C., and the third step above and the fourth step above can also simultaneously be performed. In addition, in the first step above, the flake pigments are preferably prepared in a pasty state in which the flake pigments are dispersed in an organic solvent.

Further, the solvent above not dissolving the thermosetting resin powders above preferably has a boiling point under atmospheric pressure in a range from 28 to 130° C., and the flake pigments above are preferably aluminum flakes.

In addition, the present invention also relates to a powder coating composition obtained with any manufacturing method described above.

Advantages Effects of Invention

The method of manufacturing a powder coating composition according to the present invention having the features as described above can provide a powder coating composition having characteristics required of the powder coating composition while preventing aggregation of flake pigments (for example, such characteristics as excellent recyclability, low risk, occurrence of less color unevenness, and ability to provide a coating film with metallic feel, brilliance and brightness). In particular when a metal pigment such as an aluminum flake is employed as the flake pigment, a manufactured powder coating composition can provide an excellent metallic color similar to plating.

DESCRIPTION OF EMBODIMENTS

<Powder Coating Composition>

The present invention relates to a method of manufacturing a powder coating composition. The powder coating composition manufactured with the manufacturing method according to the present invention contains thermosetting resin powders to which surface flake pigments having a specific shape have been bonded. The powder coating composition according to the present invention may contain other components, so long as it contains thermosetting resin powders to which surface such flake pigments have been bonded. For example, various additives to be added to a powder coating composition of this type can be exemplified as such other components.

Here, the "thermosetting resin powders to which surface flake pigments have been bonded" typically refer to such a form that a plurality of flake pigments are bonded to the surface of one thermosetting resin powder, and such a form is clearly distinguished from a form that a plurality of thermosetting resin powders are bonded to a surface of a flake pigment as seen in a conventional example. It is noted that inclusion of a plurality of thermosetting resin powders bonded to one another or a thermosetting resin powder to which surface only a single flake pigment has been bonded does not depart from the scope of the present invention.

In such a powder coating composition according to the present invention, in a case where a metal pigment such as an aluminum flake is included as the flake pigment having a specific shape, the powder coating composition achieves color development of a particularly good metallic color similar to plating.

<Flake Pigment>

Flake pigments contained in the powder coating composition according to the present invention have an average particle size not greater than 10 µm or an average thickness not greater than 60 nm. Flake pigments in such a shape have characteristics of being highly likely to aggregate if individual flake pigments are to be obtained in a powdery state, and hence it has conventionally been difficult to use the flake pigments in a powder coating composition.

In a case where a flake pigment in such a shape is a metal pigment, it is particularly suited for color development of a metallic color similar to plating. Examples of such metal pigments include metal flakes such as aluminum, zinc, copper, bronze, nickel, titanium, or stainless steel, and alloy flakes thereof. Among these metal pigments, the aluminum flake is particularly suitable because it has excellent metallic luster, and is inexpensive and easy to handle by virtue of its small specific gravity.

Flake pigments suited for color development of a metallic color similar to plating preferably have an average particle size not greater than 10 µm as described above and further preferably not greater than 8 µm. Though a lower limit of the average particle size is not particularly limited, the lower limit is normally 2 µm or greater, considering various conditions in manufacturing. In addition, an average thickness is preferably not greater than 60 nm and further preferably not greater than 40 nm. Though the lower limit of the average thickness is not particularly limited, the lower limit is normally 15 nm or greater, considering various conditions in manufacturing.

Provided that any one of the two conditions of the average particle size and the average thickness as above is satisfied, a metallic color similar to plating can be expressed. If the average particle size exceeds 10 µm and the average thickness exceeds 60 nm, a metallic color similar to plating cannot be expressed, aggregation property among flake pigments involved with drying lowers, and a ratio of flake pigments not bonded to thermosetting resin powders becomes higher. In addition, even when flake pigments out of such specifications as in the present invention and a thermosetting resin powder are bonded to each other with the use of the conventional bonded method, sharpness with regard to a coating film obtained thereby is low and a metallic color similar to plating cannot be expressed.

In the present invention, the flake pigment implemented by the metal pigment above may have a surface coated with a resin or the like. It is noted that an amount of coating is preferably not greater than 5 g per 100 g flake pigments. If this amount of coating exceeds 5 g, a metallic color similar to plating does not tend to be expressed even though the average particle size or the average thickness as above is set, which is not preferred. The flake pigment (metal pigment) of which surface is coated with a resin or the like as such is preferred because such risk as spark between the pigment and an electrode to which a high voltage is applied during corona powder coating can be avoided.

In a case where a metal pigment ground with a ball mill or the like is employed as the metal pigment as above, a grinding auxiliary agent to be added at the time of grinding may adsorb to the surface of such a metal pigment. Examples of such a grinding auxiliary agent include fatty acid (oleic acid, stearic acid), aliphatic amine, aliphatic amide, aliphatic alcohol, ester compound, and the like. In a case where the metal pigment is an aluminum flake, these grinding auxiliary agents are effective in suppressing unnecessary oxidation of the aluminum flake surface so as to improve luster thereof. An amount of adsorption of such a grinding auxiliary agent is preferably less than 2 parts by mass with respect to 100 parts by mass metal pigments. If the amount is equal to or larger than 2 parts by mass, the surface luster may be deteriorated.

In the present invention, use of stearic acid as a grinding auxiliary agent is particularly recommended. In a case where an aluminum flake is used as the flake pigment (metal pigment), the aluminum flake on which surface stearic acid has adsorbed is also called leafing aluminum, and it has a property of being likely to float at the interface with air phase at the time when a coating film is formed and it is particularly suitable in expression of a metallic color similar to plating.

On the other hand, in the present invention, other than the metal pigment as above, a flake pigment manufactured with a vapor deposition method of vapor depositing a metal or the like on a surface of a substrate and thereafter peeling off the metal or the like from the substrate to thereby obtain a flake piece can also suitably be used as the flake pigment. In this case, a very thin flake pigment is obtained.

Further, as a flake pigment employed in the present invention, for example, mica, surface colored mica, glass flake, surface colored glass flake, pearl, or the like can be exemplified.

The material exemplified above can be used alone or in combination of two or more types, as the flake pigment in the present invention.

It is noted that an average particle size of the flake pigment according to the present invention is found by calculating an average volume from particle size distribution measured by a known method of measuring particle size distribution such as laser diffractometry, micromesh sieve, or Coulter counter. Depending on difference in a method of manufacturing a flake pigment, a different method is adopted for measuring an average thickness. In a case of a flake pigment ground by a ball mill or the like, the flake pigment normally has a relatively large average thickness, and hence its average thickness can be calculated from density of a metal material making up the flake pigment and a water surface diffusion coverage area. On the other hand, in a case of a flake pigment manufactured with the vapor deposition method, the flake pigment has a very small thickness and the average thickness is directly measured with an atomic force microscope. According to the former, though a thickness of each one flake pigment cannot be known, however, accuracy of an average thickness as a whole is high and measurement is also simple. This former method, however, cannot be adopted for a flake pigment having a very small thickness, because flake pigments aggregate. The latter is capable of accurately measuring even a very small film thickness, however, a measurement value indicates data for each one flake pigment. Namely, in order to obtain an average representing the whole, at least 10 flake pigments should be measured and measurement is not simple.

A method of measuring an average thickness in a case where an aluminum flake is employed as a flake pigment will be described below in detail.

Initially, in a case of the former measurement method of the measurement methods above, an aluminum paste containing aluminum flakes or a powdery aluminum flake is washed with acetone and a mass w (g) of dried aluminum flakes is measured. In addition, water surface coverage area A ($cm^2$) at the time when the aluminum flakes evenly float over a water surface is measured and WCA (water surface diffusion coverage area) is calculated based on the equation 1 below. Then, a WCA value calculated as such is substituted in the equation 2 below to thereby calculate an average thickness of an aluminum flake particle.

$$\text{WCA } (cm^2/g) = A \ (cm^2)/w \ (g) \qquad \text{Equation 1}$$

$$\text{Average thickness } (\mu m) = 104/(2.5 \ (g/cm^3) \times \text{WCA}) \qquad \text{Equation 2}$$

On the other hand, in a case of the latter measurement method of the measurement methods above, after washing as above, dried aluminum flakes are evenly distributed over a glass plate, a thickness of each of any 10 aluminum flake particles is measured with a probe microscope (Nanopics 1000 manufactured by Seiko Instruments Inc.), and an average thereof is adopted as the average thickness.

In a case where flake pigments having an average thickness not greater than 60 nm are employed in the present invention, the latter method of directly measuring a thickness with the use of an atomic force microscope is preferably adopted.

Such flake pigments can be used at a blending ratio of normally about 0.05 to 5 parts by mass and more preferably 0.1 to 3 parts by mass per 100 parts by mass thermosetting resin powders. When the flake pigment is less than 0.05 parts by mass, sufficient metallic feel and brilliance may not be obtained and a thickness of a coating should be great in order to cover a substrate. When the flake pigment exceeds 5 parts by mass, sharpness similar to plating is lost, a color tone becomes blurry white, smoothness of the coating film is lost, and a tendency of poorer appearance is exhibited.

<Thermosetting Resin Powder>

Any thermosetting resin powder may be used as the thermosetting resin powder to be used in the present invention, so long as it is known as a powder coating resin for a powder coating composition of this type. Therefore, the "thermosetting resin powders" in the present invention mean even composite powders of a thermoplastic resin having a characteristic of being hardened under application of heat, with a hardener, a crosslinker or the like being blended therewith.

For example, resins of an acrylic resin type and a polyester resin type can be exemplified as particularly suitable thermosetting resin powders. The polyester resin type above includes, for example, a resin hardened by epoxy resin, a resin hardened by isocyanate (urethane type), a resin hardened by primid (primid type), and the like. In the present invention, each resin as exemplified above may be used alone or in combination of two or more types, as the thermosetting resin powders.

A hardener (a crosslinker) is contained in the thermosetting resin powders according to the present invention. The hardener is not particularly limited, and a known or commercially available hardener can be used. For example, amine, polyamide, dicyandiamides, imidazoles, dihydrazide carboxylate, acid anhydride, polysulfide, boron trifluoride, amino resin, triglycidyl isocyanurate, trisepoxypropyl isocyanurate, primid, epoxy resin, other dibasic acids, imidazolines, hydrazides, isocyanate compounds, and the like can be exemplified. An accelerator may concurrently be used, as required. Alternatively, a dispersant or the like may be added. Such a dispersant is not particularly limited, and a known or commercially available dispersant can be used. For example, a known surfactant such as phosphoric esters, amines, polyoxyethylene alkylethers, polyoxyethylene alkylphenylethers, and the like can be exemplified.

In addition, a variety of coloring agents can also be contained in the thermosetting resin powders according to the present invention. Examples of such coloring agents include quinacridon, diketopyrrolopyrrole, isoindolinone, indanthrone, perylene, perynone, anthraquinone, dioxazine, benzoimidazolone, triphenylmethane quinophthalone, anthrapyrimidine, chrome yellow, phthalocyanine, phthalocyanine halide, azo pigment (azomethine metal complex, condensed azo etc.), titanium oxide, carbon black, iron oxide, copper phthalocyanine, condensed polycyclic pigments, and the like. Though an amount of blending of these coloring agents is different depending on the type thereof, it is desirable to set the amount to be in such a range that an effect of the flake pigments according to the present invention is not lessened and smoothness of the coating film surface is not deteriorated.

The thermosetting resin powders according to the present invention can contain not only various additive components listed above but also the following additives as required. Examples of such additives include a variety of fillers such as bentonite, alumina white, calcium carbonate, barium sulfate, and talc, a variety of fluidity adjusters such as silica, alumina, and aluminum hydroxide, a variety of fluidizers such as acrylic oligomer and silicone, a variety of foaming preventing agents such as benzoin, waxes, a coupling agent, an antioxidant, magnetic powders, a stabilizer, a UV absorber, a leveling agent, a thickening agent, a precipitation preventing agent, and the like. Thus, the thermosetting resin powders according to the present invention can contain various additives and various functional materials as above.

Though the average particle size of such thermosetting resin powders is not particularly limited, it is normally set preferably to approximately 5 to 100 µm and particularly preferably to 15 to 60 µm. If the average particle size is smaller than 5 µm, it will be difficult to uniformly mix the thermosetting resin powders with the flake pigments and aggregation of the thermosetting resin powders is more likely, whereby uniform pulverization may not be achieved in powder coating. If the average particle size is over 100 µm, smoothness of the coating film surface is deteriorated, and excellent appearance may not be obtained. It is noted that such an average particle size can be found with a known method of measuring particle size distribution such as laser diffractometry, micromesh sieve, or Coulter counter.

For manufacturing such thermosetting resin powders, for example, a resin, a hardener, and various additives such as a filler added as required are prepared as raw materials, and these raw materials are initially dry-blended, using such a mixing machine as a mixer, a blender or the like. After dry blending, the raw materials are melted, and mixed and kneaded with a kneader, followed by cooling. Then, a mechanical or air crusher is used to crush the cooled, melted, mixed and kneaded substance, which is subsequently classified by an air classifier so as to obtain the thermosetting resin powders according to the present invention. Other than this method, a spray dry method or a polymerization method may be used to manufacture the thermosetting resin powders.

<Method of Manufacturing Powder Coating Composition>

A method of manufacturing a powder coating composition according to the present invention includes a first step of preparing flake pigments having an average particle size not greater than 10 µm or an average thickness not greater than 60 nm, a second step of obtaining a dispersion by dispersing the flake pigments above in a solvent not dissolving the thermosetting resin powders, a third step of obtaining a mixture by mixing the thermosetting resin powders with the dispersion above, and a fourth step of volatilizing and removing the solvent above while the mixture above is stirred. Each step will be described below.

It is noted that the method of manufacturing a powder coating composition according to the present invention may include other steps so long as the first to fourth steps above are included.

<First Step>

The first step according to the present invention is the step of preparing flake pigments having an average particle size not greater than 10 µm or an average thickness not greater than 60 nm.

As an industrial product, a flake pigment represented by an aluminum flake is less likely to be handled as dry powders, and in many cases, it is generally handled in a pasty state in which flake pigments are dispersed in an organic solvent. Therefore, in the first step according to the present invention, the flake pigments are preferably prepared in the pasty state in which flake pigments are dispersed in an organic solvent. The flake pigments, however, are not limited solely as such, and the flake pigments in a powdery state may be prepared unless the flake pigments aggregate.

In a case where the flake pigments are prepared in the pasty state, in the second step which will be described later, the flake pigments in such a pasty state can also be used as they are. The pasty flake pigments as such, however, are in the pasty state by using such an organic solvent as mineral spirit, toluene, ethyl acetate, butyl acetate, isoparaffin, or the like, and such an organic solvent except for isoparaffin dissolves or swells thermosetting resin powders normally used in the present invention. Therefore, in preparing flake pigments in the pasty state, prior to performing the second step which will be described later, such an organic solvent is preferably substituted with a solvent used in the second step, in order to lessen influence by the organic solvent.

Examples of such a method of substituting a solvent include a method of washing a paste containing such an organic solvent and flake pigments (that is, commercially available flake pigments in the pasty state) with a solvent to be used in the second step, for example, with the use of a filtering apparatus, a method of dispersing such a paste in a solvent to be used in the second step, thereafter performing filtering or centrifugation and recovering flake pigments in a state in which the paste is dispersed in the solvent to be used in the second step, and the like. It is assumed that the first step according to the present invention includes also such a step of substituting a solvent.

<Second Step>

The second step according to the present invention is the step of obtaining a dispersion by dispersing the flake pigments prepared in the first step above in a solvent not dissolving the thermosetting resin powders employed in the present invention.

The solvent employed in the present second step is not particularly limited, so long as it has such a characteristic as not dissolving thermosetting resin powders employed in the present invention. Here, "not dissolving thermosetting resin powders" means that a solvent does not have such a property as dissolving or swelling thermosetting resin powders. Though it is difficult to define this characteristic with a numeric value, such a characteristic is exhibited when a solubility parameter is normally not greater than 8.2.

In addition, a solvent not dissolving thermosetting resin powders preferably has a low boiling point. Since thermosetting resin powders for powder coating are normally melted at 50° C. to 80° C., the solvent preferably has such a low boiling point that it can be distilled out at a temperature lower than this melting temperature. Since the fourth step which will be described later is performed under vacuum at a temperature in a range from −5° C. to 50° C. and more preferably in a range from 0° C. to 30° C., the solvent is particularly desirably volatilized and removed completely in such a temperature range.

A solvent satisfying the conditions as above preferably has a boiling point under atmospheric pressure in a specific range. Namely, this boiling point is preferably not lower than 28° C. and particularly preferably not lower than 60° C. In addition, this boiling point is preferably not higher than 130° C. and particularly preferably not higher than 110° C.

If this solvent has a boiling point exceeding 130° C., it is difficult to volatilize the solvent unless a temperature exceeding 50° C. is set even under vacuum, and blocking among thermosetting resin powders tends to occur. In contrast, when this boiling point is lower than 28° C., a flash point of the solvent becomes also low, which tends to cause a problem in terms of safety.

Examples of such a solvent include straight-chain alkanes such as pentane, hexane, heptane, and octane, isoparaffins such as isopentane, isohexane, isoheptane, and isooctane, and the like.

Concentration of flake pigments in the dispersion obtained in the present second step is preferably 1 to 35 mass %, however, this value is inevitably defined in coordination with an amount of a used solvent appropriate in the subsequent third and fourth steps. For desired color development similar to plating, a type of flake pigments to be contained in the powder coating composition, which is a final product, and a ratio between the flake pigments and the thermosetting resin powders are determined. For example, it is assumed that, with regard to combination of certain flake pigments with thermosetting resin powders, optimal concentration of the flake pigments is 1 g flake pigments with respect to 100 g thermosetting resin powders. In this case, for the sake of convenience, solid concentration is assumed as 91%, although an appropriate range of the content of the solvent in the third step and the fourth step will be described later.

$$\text{Solid Concentration (\%)} = (\text{Mass of Thermosetting Resin Powders} + \text{Mass of Flake Pigments})/(\text{Mass of Thermosetting Resin Powders} + \text{Mass of Flake Pigments} + \text{Mass of Solvent}) \times 100$$

Then, based on the relational expression above, it is only necessary to mix 1 g flake pigments and 10 g solvent with 100 g thermosetting resin powders. Namely, a ratio of 10 g solvent with respect to 1 g flake pigments is defined for a dispersion prepared in the second step, and thus concentration of the flake pigments is 9.1%. If it is assumed that the flake pigments prepared in the first step are in the pasty state and concentration of the flake pigments in the paste is 50%, it is only necessary to prepare a dispersion at a ratio of 9 g solvent with respect to 2 g paste.

<Third Step>

The third step according to the present invention is the step of obtaining a mixture by mixing the dispersion obtained in the second step above with the thermosetting resin powders. More specifically, this step is preferably a step of obtaining a mixture by adding the dispersion obtained as above to the thermosetting resin powders followed by mixing and kneading. Then, the mixture is preferably a uniform mixture of the thermosetting resin powders and the dispersion.

Here, the dispersion above may be added at once or in several additions. Though such a method of addition is not particularly limited either, in industrial production, the dispersion above is preferably added by spraying to the thermosetting resin powders while the powders are stirred, because the dispersion above and the thermosetting resin powders can uniformly be mixed with each other in such a manner. Such a third step is preferably performed under atmospheric pressure.

When thermosetting resin powders are added to the dispersion above, the dispersion initially adheres to an inner wall of a mixing and stirring bath. Since a clearance is present between a stirring blade and the inner wall, it becomes difficult to uniformly mix and stir the dispersion, which is not preferred.

Here, solid concentration of the mixture is preferably 50 to 98 mass % and particularly more preferably 70 to 95 mass %. When the solid concentration exceeds 98 mass %, it may become difficult to uniformly mix the flake pigments with the thermosetting resin powders. Alternatively, when the solid concentration is lower than 50%, enormous time and energy are required for volatilizing and removing a solvent in the fourth step which will be described later.

Examples of apparatuses that can be used for mixing in such a third step include an inverted-cone-shaped ribbon mixer-stirrer, a high-speed mixer such as an atmospheric pressure kneader-mixer, a two-axis screw type kneader-mixer, a Henschel mixer, or a super mixer, and a blender.

<Fourth Step>

The fourth step according to the present invention is the step of volatilizing and removing the solvent above while the mixture obtained in the third step above is stirred. Here, "stirring" should be understood as a term covering a broad concept, that also encompasses such an action as "mixing and kneading" and the like.

In this fourth step, the powder coating composition according to the present invention can be obtained by continuing stirring until the solvent is volatilized and the entire mixture becomes powdery and classifying the mixture by using a screen after the solvent is completely removed. By thus volatilizing and removing the solvent while the mixture is stirred, flake pigments aggregate on a thermosetting resin powder and hence the thermosetting resin powders to which surface the flake pigments have been bonded are obtained. In this case, the reason why blocking among thermosetting resin powders does not occur is considered as follows.

Namely, the thermosetting resin powders themselves do not have self-aggregating property in view of the average particle size described above. In addition, a powder has such an indefinite shape as glass being crushed, and thus contact between thermosetting resin powders is either point contact or line contact. Therefore, blocking among thermosetting resin powders does not occur because mixing and stirring is continued even during removal of the solvent and bonding achieved by point contact or line contact between thermosetting resin powders is easily broken by external physical force applied during stirring or the like.

In contrast, it is considered that contact between a flake pigment and a thermosetting resin powder is plane contact and an aggregation effect is readily expressed so that the flake pigments are bonded onto the thermosetting resin powder. A manner of such bonding between the flake pigments and the thermosetting resin powder is probably expected to be Van der Waals bond, although details are unknown.

Here, in such a fourth step, the solvent is preferably volatilized and removed while vacuum suction is carried out. In addition, in this fourth step, the mixture above is preferably stirred in a range from −5° C. to 50° C. The mixture above is more preferably held particularly at a temperature not lower than 0° C. and the mixture above is more preferably held at a temperature not higher than 35° C. If the temperature exceeds 50° C., bonding between thermosetting resin powders is promoted and blocking may occur. In this case, though aggregated particles (blocking particles) can be loosened and crushed by a physical crushing method such as a jet mill, with that operation, flake pigments may peel off from the surface of the thermosetting resin powder and then destruction of a thermosetting resin powder particle itself may be caused. Alternatively, if the temperature above is lower than −5° C., a long time is required for volatilization of the solvent, which is not practical. Namely, the fourth step according to the present invention is preferably performed at a temperature at which blocking among thermosetting resin powders does not occur (that is, a temperature not higher than a melting temperature of thermosetting resin powders) and volatilization of the solvent above is efficiently achieved.

In the present invention, the third step and the fourth step above can also continuously be performed in the same apparatus such as an inverted-cone-shaped ribbon mixer-stirrer or a vacuum kneader-mixer. Alternatively, the third step and the fourth step above can also simultaneously be performed. That is, while the thermosetting resin powders and the dispersion above are mixed and stirred, at the same time, the solvent can successively be volatilized and removed from the mixture. The third step and the fourth step, however, are preferably performed as separate, independent steps, because productivity can be improved.

The apparatus used in the third step above can be used as it is as the apparatus that can be used for stirring in such a fourth step, and in any case of using any apparatus, the solvent can be volatilized and removed by continuing stirring after the third step above ended and preferably by carrying out vacuum suction.

In addition, the fourth step can also be performed by once taking out the mixture from the apparatus after the third step above ended and thereafter again introducing the mixture into such a dryer as a vibration dryer, a continuous fluidized-bed dryer, or the like.

<Applications etc.>

The present invention also relates to a powder coating composition obtained with the manufacturing method as above. As a method of applying such a powder coating composition, preferably, a powder coating composition is attached to a member to be coated (substrate) of which coating surface is subjected to blast treatment in advance and thereafter to a known treatment such as chemical conversion treatment, followed by heating and hardening.

Though a member to be coated is not particularly restricted, a member which is not susceptible to deformation or quality change due to heating and hardening (baking) is preferable. For example, known metals such as iron, copper, aluminum, and titanium and a variety of alloys are exemplified as preferable members. Specific forms include, for example, a car body, office products, housewares, sporting goods, building materials, electric appliances, and the like.

As a method of attaching the powder coating composition according to the present invention to the substrate surface, for example, immersion coating, electrostatic powder coating or the like can be applied. Here, electrostatic powder coating is more preferable because of its excellent coating and adhesion efficiency. For example, a known method such as corona discharge or triboelectrification can be used as a method of electrostatic powder coating.

A heating and hardening temperature above can be set as required in accordance with a type of the used thermosetting resin powder, and normally it is set to 120° C. or higher and preferably to 150 to 230° C. A heating time may be selected as required in accordance with the heating temperature, and it is generally set to one minute or longer, and preferably to 5 to 30 minutes. Though not limited, the coating film formed by heating normally has a thickness approximately from 20 to 100 μm.

In the present invention, expression of a metallic color similar to plating of the coating film can be evaluated based on glossiness (luster).

EXAMPLES

Examples and comparative examples of the present invention will be shown below for further clarification of the features of the present invention. It is noted that the present invention is not limited to these examples.

Samples in the examples and the comparative examples, an evaluation method, and equipment used will initially be described.

<Method of Measuring Non-Volatile Content in Paste Containing Flake Pigments>

In a case where flake pigments are prepared in a pasty state (hereinafter such a paste is referred to as a "flake-pigment-containing paste"), a numeric value determined as a non-volatile content is employed as a ratio of flake pigments contained in a flake-pigment-containing paste.

Initially, a cylindrical metal container (bottom 40 mm Φ, height 50 mm) is accurately weighed in advance. Then, approximately 5 g flake-pigment-containing paste which is a sample is taken into the cylindrical metal container and an amount taken is accurately weighed. Then, approximately 20 ml mineral spirit is further added to the cylindrical metal container to disperse the flake pigments, and thereafter the cylindrical metal container is placed on a sand bath at 300° C. to thereby completely evaporate the solvent (approximately 20 minutes). After cooling to room temperature, a mass of the cylindrical metal container was again measured and a non-volatile content was measured based on the following equation.

Non-Volatile Content (%)=(Mass of Cylindrical Metal Container After Heating−Mass of Cylindrical Metal Container)/Mass of Sample×100

<Method of Measuring Average Particle Size (D50)>

An ethanol-based solvent (GS Alco EP-7 manufactured by GODO Co., Ltd.) was employed as the solvent, and Microtrac 9320 X-200 manufactured by Honeywell was used to measure an average particle size (D50). In a case where a sample is a flake-pigment-containing paste, approximately 0.5 g sample was dispersed in toluene, the dispersion was dropped into a measurement bath (filled with the ethanol-based solvent above) for dispersion by ultrasound (40 W, 30 seconds), and thereafter an average particle size (D50) was measured. In a case where a sample is in a powdery state, approximately 0.5 g sample was dispersed in the ethanol-based solvent above and an average particle size (D50) was measured.

<Thermosetting Resin Powder>

The thermosetting resin powders used in the examples and the comparative examples of the present invention are polyester-based resin powders (Teodur PE 785-900 clear manufactured by Kuboko Paint Co., Ltd.).

<Method of Evaluation of State of Bonding Between Thermosetting Resin Powder and Flake Pigments>

A thermosetting resin powder to which surface flake pigments have been bonded is referred to as "bonded", however, a ratio of bonding between the thermosetting resin powder and the flake pigments has conventionally been not much discussed. Regarding this bonding ratio, conceptually, a bonding ratio of 0% can be expressed as dry blend and a bonding ratio of 100% can be expressed as ideally bonded. In an actual industrial product, it never happens that a free flake pigment not bonded to a thermosetting resin powder is absent. Namely, there is no clear boundary in terms of a bonding ratio between dry blend and bonded. If this bonding ratio becomes lower, however, the problems in the dry blending method described previously arise. In particular when a metal pigment is employed as the flake pigment suited for color development of a metallic color similar to plating, electrostatic coating poses danger. Then, a bonding state also of a sample on which a bonding operation has been performed should be checked and then electrostatic coating should be performed.

Here, as an indication of a state of bonding between a thermosetting resin powder and flake pigments, a ratio of bonding between a thermosetting resin powder and flake pigments was measured as follows. Namely, the present measurement method makes use of difference in shape between "flaky" and "particulate". In other words, the method is based on the premise that a thermosetting resin powder to which surface flake pigments have been bonded is regarded as "particulate" and a free flake pigment is regarded as "flaky". Then, by making use of characteristics derived from difference in shape therebetween, that is, difference in a ratio of adhesion to a sheet surface, a bonding ratio is measured as approximation.

More specifically, a measurement method is based on assumption as below. Namely, it is assumed that contact between the sheet surface (plane) and a "particulate" substance is regarded as point contact, and the "particulate" substance has a sufficient mass and hence when vibration is applied thereto, the "particulate" substance readily peels off from the sheet surface. On the other hand, it is assumed that a "flaky" substance is in plane contact with the sheet surface because it is flaky, and it is small in volume and mass, and hence it adheres to the sheet surface even after vibration is applied.

Actually, a sample is uniformly spread over the surface of a sheet of black art paper, and thereafter an operation to apply vibration to the sheet of black art paper to shake off the sample is performed. Thus, the "flaky" substance and the "particulate" substance can be separated from each other. Namely, the "flaky" substance remains on the sheet surface as adhering to the sheet surface, while the "particulate" substance peels off from the sheet surface, thus these being separated from each other.

Therefore, in a case where an aluminum flake was employed as the flake pigment, since the flake pigment which is the "flaky" substance adhering to the sheet of black art paper has a silver color, an adhesion state can readily be checked by visual inspection by observing the color. In other words, as the silver color is more intense, an amount of flake pigments adhering to the sheet of black art paper is large, that is, the bonding ratio above is low. In contrast, as flake pigments adhering to the sheet of black art paper are fewer (the silver color is weaker), evaluation as the bonding ratio above being high can be made.

Namely, evaluation was made such that, if there were few flake pigments adhering to the sheet of black art paper, a bonding state was good (evaluation "A" in Table 1), if there were a few flake pigments adhering to the sheet of black art paper, a bonding state was incomplete (evaluation "B"), and there were many flake pigments adhering to the sheet of black art paper, a bonding state was bad (evaluation "C").

<Powder Coating Method>

A coated plate was fabricated by coating a standard test plate manufactured by Nippon Test Panel Co., Ltd. (a bonderized steel plate of 100×200 mm) with a powder coating composition using a corona discharge electrostatic powder coating apparatus (trademark "MXR-100VT-mini" manufactured by Asahi Sunac Corporation) at an application voltage of 80 kV, and by baking the plate at 190° C. for 20 minutes.

<Glossiness Measurement Method>

A metallic color similar to plating was evaluated by measuring glossiness (luster) with a glossimeter (Gloss Meter TC-108DP/A manufactured by Tokyo Denshoku Co., Ltd.), by emitting light at an angle of 60° with respect to a normal of the coated plate and receiving light at a position of regular reflection. In Table 1, it is denoted as "Gloss", and a higher numeric value indicates a better metallic color similar to plating.

<Evaluation of Sharpness by Visual Inspection>

Sharpness in present evaluation was evaluated based on whether a reflected image (mirror image) visually recognized as a result of reflection by a coating film can clearly be seen or not. If a degree of diffuse reflection is high in spite of a high reflectance of light, a mirror image cannot be seen as it merely shines in white. Since plating provides reflection like a mirror surface, a degree of similarity to plating can be evaluated based on whether a mirror image representing the greatest feature is seen or not.

Specifically, evaluation was made in such a manner that an observer's face was mirrored in a coated plate, and then a state where the observer's eyes, nose, mouth, and the like were distinguishable was defined as "A", a state where the observer's face contour was distinguishable but his/her eyes and nose were indistinguishable was defined as "B", and a state where even the observer's face contour was indistinguishable was defined as "C". Table 1 shows results of evaluation (Sharpness (Evaluation by Visual Inspection)).

Example 1

An aluminum paste (trademark: 0670TS) manufactured by Toyo Aluminium K.K. (containing aluminum flakes as flake pigments) was prepared as the flake pigments in the pasty state. This 50 g flake pigments in the pasty state were dispersed in 280 g normal heptane (boiling point of 98.4° C.) and the dispersion was subjected to centrifugation at 3000 rpm for 20 minutes with the use of a centrifugal separator (H-38F manufactured by KOKUSAN Co., Ltd.). An obtained precipitate was the flake pigments in the pasty state of which solvent had been substituted by normal heptane, a non-volatile content was 65.1%, and the flake pigments had the average particle size (D50) of 4.7 µm and the average thickness of 60 nm (up to here, the "first step"). It is noted that "0670TS" is a type called a leafing type, and stearic acid adsorbs onto the surface thereof.

Then, a dispersion was fabricated by dispersing 0.93 g flake pigments in the pasty state prepared as above (the aluminum paste of which solvent had been substituted with normal heptane) in 20 g normal heptane (a solvent not dissolving thermosetting resin powders) (second step).

Then, a mixture was obtained by adding a total amount of the dispersion obtained as above to 100 g thermosetting resin powders (trademark: Teodur PE 785-900 clear) followed by mixing and stirring well (third step).

In succession, normal heptane naturally evaporated while mixing and kneading (stirring) was continued. This evaporation operation was performed until fluidity specific to dry powders was recovered, and the mixture was dried until sufficient fluidity was obtained. Thereafter, the mixture was placed in an eggplant-shaped flask of 1 liter and stirred under vacuum (room temperature of approximately 20° C.) while being rotated by means of an evaporator, so that normal heptane was completely volatilized and removed (fourth step; note that this fourth step was performed for approximately 20 minutes). The powder coating composition according to the present invention was obtained as a sample, by screening the obtained powders through a 100 µm mesh screen.

A state of bonding between the thermosetting resin powder and the flake pigments in the powder coating composition thus obtained was evaluated. Then, the bonding state was excellent and there was almost no flake pigment adhering and remaining on the sheet of black art paper. Then, powder coating was carried out, and lowering in an application voltage or spark was not observed. In addition, sharpness with regard to a coated plate obtained by powder coating with this powder coating composition was evaluated by visual inspection. Then, a good metallic color similar to plating was exhibited. The result of measurement of glossiness indicated 248.

Example 2

Flake pigments (aluminum flakes) in the pasty state of which solvent had been substituted by normal heptane were prepared by performing the first step as in Example 1, except for using an aluminum paste (trademark: 0231E-N) manufactured by Toyo Aluminium K.K. instead of the aluminum paste (trademark: 0670TS) manufactured by Toyo Aluminium K.K. employed in Example 1. The non-volatile content of these flake pigments in the pasty state was 71.3%, and the flake pigments had the average particle size (D50) of 7.2 µm and the average thickness of 130 nm. It is noted that "0231E-N" is also a type called a leafing type, and stearic acid adsorbs onto the surface thereof.

Then, a dispersion was fabricated by dispersing 1.68 g flake pigments in the pasty state prepared as above (the aluminum paste of which solvent had been substituted with normal heptane) in 20 g normal heptane (a solvent not dissolving thermosetting resin powders) (second step).

Then, the third step and the fourth step were performed as in Example 1, except for using the total amount of the dispersion obtained as above.

A state of bonding between the thermosetting resin powder and the flake pigments in the powder coating composition thus obtained was evaluated. Then, the bonding state was excellent and there was almost no flake pigment adhering and remaining on the sheet of black art paper. Then, powder coating was carried out, and lowering in an application voltage or spark was not observed. In addition, sharpness with regard to a coated plate obtained by powder coating with this powder coating composition was evaluated by visual inspection. Then, a good metallic color similar to plating was exhibited. The result of measurement of glossiness indicated 231.

Example 3

An aluminum paste (trademark: Metasheen 71-0010, non-volatile content of 10%) manufactured by Toyo Aluminium K.K. (containing aluminum flakes as the flake pigments) was prepared as the flake pigments in the pasty state. Five-hundred-gram normal heptane was added to this 198.3 g flake pigments in the pasty state so that the flake pigments were dispersed. In succession, a precipitate was obtained by performing a centrifugation operation as in Example 1, and 300 g normal heptane was further added to this precipitate for dispersion again. Then, the flake pigments in the pasty state of which solvent had been substituted with normal heptane were obtained by performing again the centrifugation operation the same as above on this dispersion (first step). The non-volatile content of these flake pigments in the pasty state was 38.7%, and the flake pigments had the average particle size (D50) of 12.9 µm and the average thickness of 25 nm. It is noted that "Metasheen 71-0010" is a product manufactured with a method of vapor-depositing aluminum, and stearic acid has not adsorbed to the surface thereof.

Then, a dispersion was fabricated by dispersing 1.03 g flake pigments in the pasty state prepared as above (the aluminum paste of which solvent had been substituted with normal heptane) in 20 g normal heptane (a solvent not dissolving thermosetting resin powders) (second step).

Then, the third step and the fourth step were performed as in Example 1, except for using the total amount of the dispersion obtained as above.

A state of bonding between the thermosetting resin powder and the flake pigments in the powder coating composition thus obtained was evaluated. Then, the bonding state was excellent and there was almost no flake pigment adhering and remaining on the sheet of black art paper. Then, powder coating was carried out, and lowering in an application voltage or spark was not observed. In addition, sharpness with regard to a coated plate obtained by powder coating with this powder coating composition was evaluated by visual inspection. Then, a good metallic color similar to plating was exhibited. The result of measurement of glossiness indicated 189.

Example 4

The flake pigments contained in the aluminum paste obtained by the vapor deposition method and employed in Example 3 (aluminum flakes, hereinafter also denoted as "vapor-deposited aluminum") were subjected to leafing treatment with the use of a surface treatment agent described in WO2005/007755, and the resultant flake pigments were employed as the flake pigments to be used in the present invention. A powder coating composition according to the present invention was prepared with the method the same as in each example above.

(Preparation of Surface Treatment Agent)

In a 1-liter separable flask, 48.2 g (perfluorooctyl)ethyl acrylate (trademark: Light-Acrylate FA-108 manufactured by Kyoeisha Chemical Co., Ltd.), 6.5 g (2-methacryloyloxyethyl)acid phosphate (trademark: Light-Ester P-1M manufactured by Kyoeisha Chemical Co., Ltd.), 45.7 g methyl methacrylate, and 360 g cyclohexanone were introduced and stirred well, to thereby obtain a uniform solution.

In succession, a system was sufficiently substituted with nitrogen and a temperature was raised to 70° C. Thereafter, 0.8 g AIBN was added as a polymerization initiator so as to start reaction. A surface treatment agent for leafing treatment of the flake pigment was obtained by adding 9.8 g methyl methacrylate 3 hours and 6 hours after the start of reaction and leaving the resultant substance for reaction for 20 hours.

Approximately 20 g surface treatment agent obtained was accurately weighed and diluted with 20 g acetone. Thereafter, this dilution was dropped into 1700 ml hexane that had vigorously been stirred. Then, concentration of a polymer in the surface treatment agent solution was calculated by filtering a precipitated polymer component followed by drying and weighing. Concentration of the polymer which is an active component was 18.1%.

(Leafing Treatment of Vapor-Deposited Aluminum Using Surface Treatment Agent)

A dispersion of vapor-deposited aluminum was obtained by diluting 300 g aluminum paste containing vapor-deposited aluminum (Metasheen 71-0010, non-volatile content of 10%) (that is, 30 g flake pigments) with 208 g ethyl acetate. On the other hand, a dilution of the surface treatment agent was obtained by diluting 6.6 g surface treatment agent solution prepared above (equivalent to 1.2 g surface treatment agent (polymer component), because concentration of an active component in the surface treatment agent solution was 18.1%) with 253 g ethyl acetate. Then, the dilution of the surface treatment agent was added to the dispersion of the vapor-deposited aluminum obtained as above while it is stirred.

Then, the surface treatment agent was adsorbed onto the surface of vapor-deposited aluminum which is the flake pigment, by continuing stirring at 75° C. for 1 hour. Thereafter, the paste in which the flake pigments subjected to leafing treatment were dispersed in ethyl acetate was obtained by performing the centrifugation operation as in Example 1. The measured non-volatile content of the paste was 29.1%.

(Preparation of Powder Coating Composition Using Vapor-Deposited Aluminum Subjected to Leafing Treatment)

The flake pigments (vapor-deposited aluminum subjected to leafing treatment) were dispersed by adding 25 g ethyl acetate to 24 g paste obtained as above. Thereafter, the flake pigment paste was separated by pouring the dispersion above in 280 g normal heptane that had vigorously been stirred and by performing the centrifugation operation the same as above. The first step was completed by substituting the solvent by adding 280 g normal heptane further to this paste in order to completely remove ethyl acetate after removal of a supernatant liquor, followed by dispersion again, and by performing the centrifugation operation the same as above. The measured non-volatile content of the obtained flake pigment paste was 18.3%, and the flake pigments had the average particle size (D50) of 13.0 μm and the average thickness of 25 nm.

Then, a dispersion was fabricated by dispersing 2.7 g flake pigments in the pasty state prepared as above (the aluminum paste of which solvent had been substituted with normal heptane) in 20 g normal heptane (a solvent not dissolving thermosetting resin powders) (second step).

Then, in succession, the third step and the fourth step as in Example 1 were performed.

A state of bonding between the thermosetting resin powder and the flake pigments in the powder coating composition thus obtained was evaluated. Then, the bonding state was excellent and there was almost no flake pigment adhering and remaining on the sheet of black art paper. Then, powder coating was carried out, and lowering in an application voltage or spark was not observed. In addition, sharpness with regard to a coated plate obtained by powder coating with this powder coating composition was evaluated by visual inspection. Then, a good metallic color similar to plating was exhibited. The result of measurement of glossiness indicated 229.

Comparative Example 1

Five-gram flake pigments in the pasty state prepared in the first step in Example 1 were dried at rest. Then, the flake pigments aggregated with the paste form being maintained. Then, 5 g flake pigments in the pasty state prepared in the first step in Example 1 were placed in a petri dish and naturally dried while a mass was continuously loosened well with a spoon. Then, at the timing when fluidity substantially as high as dry powders was obtained, the flake pigments were placed in a vacuum desiccator for vacuum drying at room temperature for 1 hour, to thereby completely volatilize and remove the solvent (normal heptane).

After the obtained powders were screened through a 100-μm mesh screen, the powders that passed through the screen accounted only for 47%. The powders that passed through the screen had the average particle size (D50) of 5.4 μm. In view of the manner of screening, however, the flake pigments which were powders obtained as above clearly aggregated, and an accurate grain size was unknown with the use of a particle size distribution measurement method employing a liquid as a medium, because dispersion again in the medium occurred. From the foregoing, in Table 1, denotation as "aggregated" was simply given.

A powder coating composition was obtained by adding 0.6 g powders above to 100 g thermosetting resin powders the same as used in Example 1 and by performing dry blending. Namely, this powder coating composition corresponds to a dry blended product obtained with the conventional dry blending method.

A bonding state of this powder coating composition was evaluated as in Example 1. Then, a large amount of aluminum powders adhered to the sheet of black art paper. Namely, it was confirmed that the ratio of bonding between the thermosetting resin powder and the flake pigments was extremely low and a large amount of free flake pigments was present. Therefore, determination as dangerous was made and powder coating could not be performed. In addition, even though powder coating as in the example is performed by using such a powder coating composition, it is expected that a metallic color similar to plating cannot be expressed because the flake pigments aggregated in a dry powder state.

Comparative Example 2

A powder coating composition (bonded) was obtained by using the powdery flake pigments obtained in Comparative Example 1 and performing bonding with the conventional bonded method using a binder (Patent Literature 4).

Specifically, a dry blended product was obtained initially by mixing 0.6 g powdery flake pigments obtained in Comparative Example 1 with 100 g thermosetting resin powders the same as used in Example 1. A binder of 1.5 g (trademark: YS Polyster TH-130 manufactured by Yasuhara Chemical Co., Ltd.) was dissolved in 20 g normal heptane, and this solution was added to the dry blended product obtained as above and sufficiently mixed therewith. The powder coating composition was obtained by successively performing the operation the same as in the fourth step in Example 1.

A state of bonding between the thermosetting resin powder and the flake pigments in the powder coating composition thus obtained was evaluated. Then, the bonding state was excellent and there was almost no flake pigment adhering and remaining on the sheet of black art paper. Then, powder coating was carried out, and lowering in an application voltage or spark was not observed. In addition, sharpness with regard to a coated plate obtained by powder coating with this powder coating composition was evaluated by visual inspection. Then, a good metallic color similar to plating was exhibited. The result of measurement of glossiness, however, indicated 197.

Though a metallic color similar to plating could consequently be expressed even with the use of the powder coating composition, a plurality of steps of the drying step, the screening step and the dry blending step were added to Example 1 and manufacturing efficiency significantly lowered. In addition, in spite of use of the same flake pigments as in Example 1, the result of measurement of glossiness was poorer than in Example 1.

Though the reason therefor is unclear, probably, such reasons as the flake pigments aggregated in the drying step, color development of a metallic color similar to plating of the flake pigments deteriorating due to presence of the binder used in the conventional bonded method, and the like are estimated. Namely, it could be confirmed that the manufacturing method according to the present invention was superior to the conventional manufacturing method.

Comparative Example 3

An aluminum paste manufactured by Toyo Aluminium K.K. (trademark: P-0100 (powder), the flake pigments being the aluminum flakes having the average particle size D50 of 19.7 μm and the average thickness of 300 nm) in an amount of 1.5 g was dispersed in 20 g normal heptane, and the dispersion was added to 100 g thermosetting resin powders the same as used in Example 1 and mixed well therewith. It is noted that the merchandise "P-0100" is also a type called a leafing type, and stearic acid adsorbs onto the surface thereof. In addition, this merchandise is a powdery product obtained by industrially drying a paste. Hereinafter, the powder coating composition was obtained by performing an operation the same as in the fourth step in Example 1.

A bonding state of this powder coating composition was evaluated as in Example 1. Then, a large amount of aluminum powders adhered to the sheet of black art paper. Namely, it was confirmed that the ratio of bonding between the thermosetting resin powder and the flake pigments was extremely low and a large amount of free flake pigments was present. Therefore, determination as dangerous was made and powder coating could not be performed. Namely, it could be confirmed that the flake pigments could not sufficiently be bonded to the surface of the thermosetting resin powder with the method according to the present invention when the flake pigments had the average particle size (D50) exceeding 10 μm.

Comparative Example 4

A powder coating composition (bonded) was obtained by using the flake pigments used in Comparative Example 3 and performing bonding with the conventional bonded method using a binder (Patent Literature 4).

More specifically, a dry blended product was obtained initially by mixing 1.5 g powdery flake pigments used in Comparative Example 3 with 100 g thermosetting resin powders the same as used in Example 1. A binder of 1.5 g the same as used in Comparative Example 2 was dissolved in 20 g normal heptane and this solution was added to the dry blended product obtained as above and sufficiently mixed therewith. The powder coating composition was obtained by successively performing the operation the same as in the fourth step in Example 1.

A state of bonding between the thermosetting resin powder and the flake pigments in the powder coating composition thus obtained was evaluated. Then, the bonding state was excellent and there was almost no flake pigment adhering and remaining on the sheet of black art paper. Then, powder coating was carried out, and lowering in an application voltage or spark was not observed. In addition, sharpness with regard to a coated plate obtained by powder coating with this powder coating composition was evaluated by visual inspection. Then, though white luster was observed, sharpness that could be evaluated as being similar to plating was not observed. The result of measurement of glossiness indicated 122.

Reference Examples

In order to check a degree of good sharpness exhibited by a metallic color similar to plating in the powder coating composition according to the present invention, verification was made by using results of measurement of glossiness serving as an indication thereof and by comparing Examples above with Reference Examples below. Namely, to which extent a numeric value for glossiness in Examples above according to the present invention is greater than that of a general metallic-powder-coated film representing Reference Example 1 below was checked.

Measurement of glossiness is largely affected also by smoothness of the coating film, and if smoothness is high in spite of absence of a pigment reflecting light such as a flake pigment, high glossiness may be expressed owing to reflection by a resin itself. Therefore, glossiness in a case where the thermosetting resin powders alone used in Examples here were applied is also shown as Reference Example 2. When no pigment is added, highest fluidity is obtained during baking. Therefore, this Reference Example 2 is considered to exhibit a highest value of reflection derived from a resin because it gives highest smoothness in a case of forming a coating film with the thermosetting resin powders used here.

Reference Example 1

A flake pigment (aluminum flake) generally used in powder coating is coated with a resin. For use in dry blending, coating with resin is provided in order to secure safety during electrostatic coating and chemical resistance of the coating film, while for use in bonded, coating with resin is provided in order to secure chemical resistance of the coating film. Therefore, as a general, representative example of such a flake pigment, a powdery product obtained by coating with resin, a flake pigment (an aluminum flake) having a particle size as called a medium particle size among flake pigments (aluminum flakes) used as a coating was powder-coated with dry blending.

Namely, 10 g aluminum powder pigments (trademark: PCF 7640A having the average particle size (D50) of 18.1 μm and the average thickness of 400 nm) manufactured by Toyo Aluminium K.K. were dry blended with 100 g thermosetting resin powders the same as used in Example 1. Then, glossiness of a coated plate obtained by powder-coating this dry blended product was measured. Then, glossiness was 61.

Reference Example 2

The thermosetting resin powders alone the same as used in Example 1 were applied. Then, glossiness of a coated plate thus obtained was measured. Then, glossiness was 98. Namely, glossiness exhibited in Examples and Comparative Examples above is considered to reflect reflection by the flake pigments, without being much affected by luster of the resin itself.

Table 1 below summarizes the results in experiments above (evaluation results). As can clearly be seen in Table 1, the powder coating composition obtained with the manufacturing method according to the present invention (Examples) clearly exhibits results better than those of the powder coating compositions in Comparative Examples and Reference Examples.

TABLE 1

|  |  | Example 1 | Example 2 | Example 3 | Example 4 | Comparative Example 1 | Comparative Example 2 | Comparative Example 3 | Comparative Example 4 | Reference Example 1 | Reference Example 2 |
|---|---|---|---|---|---|---|---|---|---|---|---|
| Flake Pigment | Trademark, etc. | 0670TS | 0231E-N | 71-0010 | 71-0010 Subjected to Leafing Treatment | 0670TS | 0670TS | P-0100 | P-0100 | PCF7640A | — |
|  | Form During Use | Paste | Paste | Paste | Paste | Powder | Powder | Powder | Powder | Powder | — |
|  | Average Particle Size (μm) | 4.7 | 7.2 | 12.9 | 13.0 | Aggregated *Note 1 | Aggregated *Note 1 | 19.7 | 19.7 | 18.1 | — |
|  | Average Thickness (nm) | 60 | 130 | 25 | 25 | — | — | 300 | 300 | 400 | — |
| Amount of Blending of Flake Pigments in Powder Coating Composition (PHR) |  | 0.6 | 1.2 | 0.4 | 0.5 | 0.6 | 0.6 | 1.5 | 1.5 | 10 | — |
| Amount of Addition of Binder (PHR) |  | — | — | — | — | — | 1.5 | — | 1.5 | — | — |
| State of Bonding Between Thermosetting Resin Powder and Flake Pigments |  | A | A | A | A | C | A | C | A | C | — |
| Sharpness (Evaluation by Visual Inspection) |  | A | A | A | A | Evaluation Not Available | A | Evaluation Not Available | C | C | — |
| Gloss |  | 248 | 231 | 189 | 229 | Evaluation Not Available | 197 | Evaluation Not Available | 122 | 61 | 98 |

*Note 1:
A large amount of screening residue was present.
PHR: Abbreviation of Per Hundred Resin; indicative of an amount of blending per 100 g thermosetting resin powders Though the embodiments and the examples of the present invention have been described above, combination of the embodiments and the examples described above as appropriate is also originally intended.

It should be considered that the embodiments and the examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A method of manufacturing a powder coating composition containing thermosetting resin powders and flake pigments, wherein said flake pigments are directly bonded to the surface of said thermosetting resin powders through plane contact therebetween, comprising:
   a first step of preparing the flake pigments having an average thickness not greater than 60 nm;
   a second step of obtaining a dispersion by dispersing said flake pigments in a solvent which does not dissolve said thermosetting resin powders;
   a third step of obtaining a mixture by mixing said thermosetting resin powders with said dispersion; and
   a fourth step of volatilizing and removing said solvent while said mixture is stirred, wherein the method is conducted with the exclusion of a binder.

2. The method of manufacturing a powder coating composition according to claim 1, wherein in said fourth step, said mixture is stirred in a temperature range of from −5° C. to 50° C.

3. The method of manufacturing a powder coating composition according to claim 1, wherein said third step and said fourth step are simultaneously performed.

4. The method of manufacturing a powder coating composition according to claim 1, wherein in said first step, said flake pigments are prepared in a pasty state in which the flake pigments are dispersed in an organic solvent.

5. The method of manufacturing a powder coating composition according to claim 1, wherein the solvent, which does not dissolve said thermosetting resin powders, has a boiling point under atmospheric pressure in a temperature range of from 28 to 130° C.

6. The method of manufacturing a powder coating composition according to claim 1, wherein said flake pigments are aluminum flakes.

7. A powder coating composition obtained by the manufacturing method according to claim 1.

8. The method of manufacturing a powder coating composition according to claim 1, wherein the flake pigments have an average particle size of 2 μm to 10 μm.

9. The method of manufacturing a powder coating composition according to claim 1, wherein the flake pigments have an average thickness of 15 nm to 60 nm.

10. The method of manufacturing a powder coating composition according to claim 1, wherein the thermosetting resin powders have an average particle size of 5 μm to 100 μm.

* * * * *